US009412057B2

(12) United States Patent
Kamitani et al.

(10) Patent No.: US 9,412,057 B2
(45) Date of Patent: Aug. 9, 2016

(54) ELECTRONIC DEVICE, METHOD OF DISPLAYING TWO-DIMENSIONAL CODE, AND RECORDING MEDIUM WITH PROGRAM RECORDED THEREON

(71) Applicant: CASIO COMPUTER CO., LTD., Shibuya-ku, Tokyo (JP)

(72) Inventors: Saburo Kamitani, Kokubunji (JP); Manato Ono, Wako (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/854,841

(22) Filed: Sep. 15, 2015

(65) Prior Publication Data

US 2016/0140430 A1    May 19, 2016

(30) Foreign Application Priority Data

Nov. 13, 2014  (JP) .................................. 2014-230356

(51) Int. Cl.
G06K 19/06 (2006.01)
(52) U.S. Cl.
CPC .... G06K 19/06112 (2013.01); G06K 19/06037 (2013.01)
(58) Field of Classification Search
USPC ............ 235/494, 462.09, 462.1, 462.01, 375
See application file for complete search history.

(56) References Cited

U.S. PATENT DOCUMENTS

| 7,028,911 B2* | 4/2006 | Cheung et al. ................ 235/494 |
| 7,562,397 B1* | 7/2009 | Mithal et al. ..................... 726/33 |
| 8,550,352 B2* | 10/2013 | Guo et al. .................. 235/462.1 |
| 2014/0095888 A1* | 4/2014 | Dougharty ............... G09C 5/00 713/189 |

FOREIGN PATENT DOCUMENTS

JP       2011076540 A    4/2011

OTHER PUBLICATIONS

Japanese Office Action (and English translation thereof) dated Apr. 12, 2016, issued in counterpart Japanese Application No. 2014-230356.
"TINY QR", [online], Jun. 1, 2005, [Searching date: Mar. 29, 2016], URL: http://p6ers.net/kaw/2005/p6_tinyqr.htm.

* cited by examiner

*Primary Examiner* — Edwyn Labaze
(74) *Attorney, Agent, or Firm* — Holtz, Holtz & Volek PC

(57) ABSTRACT

An electronic device includes: a display unit which displays data and a two-dimensional code; and a processor. The processor performs: an encoding process of encoding the data displayed on the display unit into the two-dimensional code; a two-dimensional code displaying process of performing a first masking operation to the two-dimensional code with a first mask pattern and displaying the code having been subjected to the first masking operation on the display unit; and a two-dimensional code changing process of performing a second masking operation to the two-dimensional code with a second mask pattern, and displaying the code having been subjected to the second masking operation instead of the code having been subjected to the first masking operation on the display unit, when a user operation is executed while the two-dimensional code having been subjected to the first masking operation is displayed on the display unit.

22 Claims, 8 Drawing Sheets

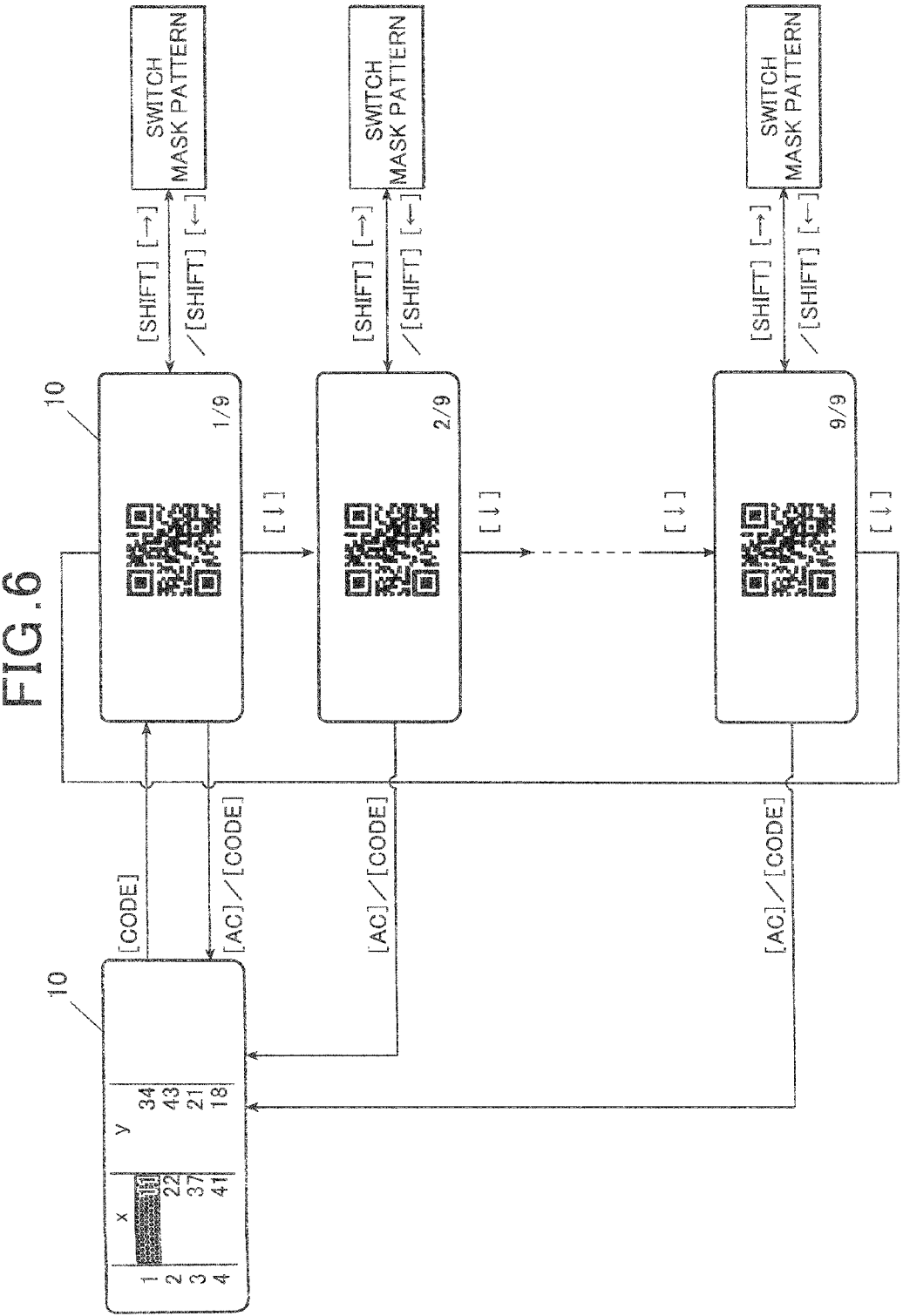

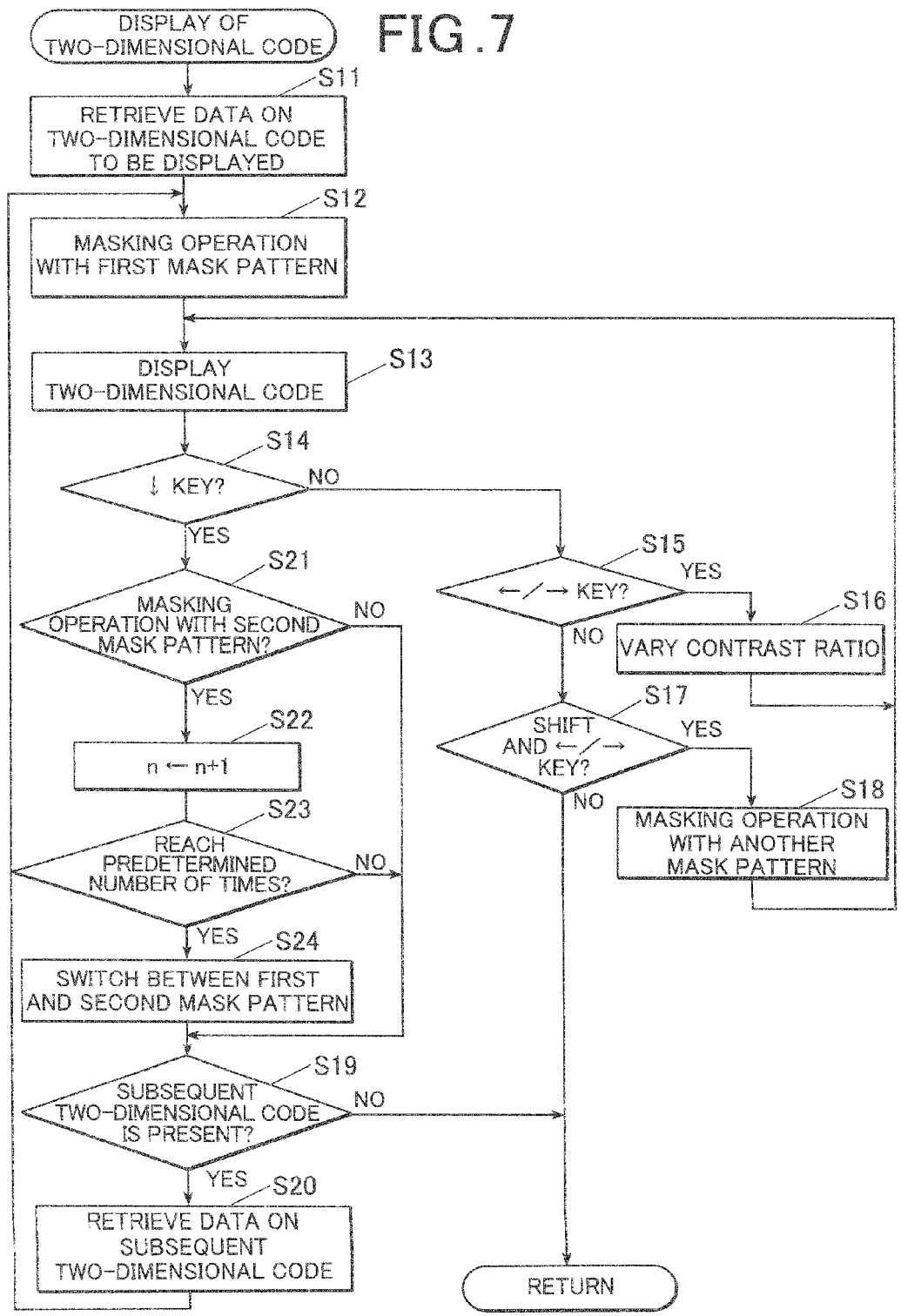

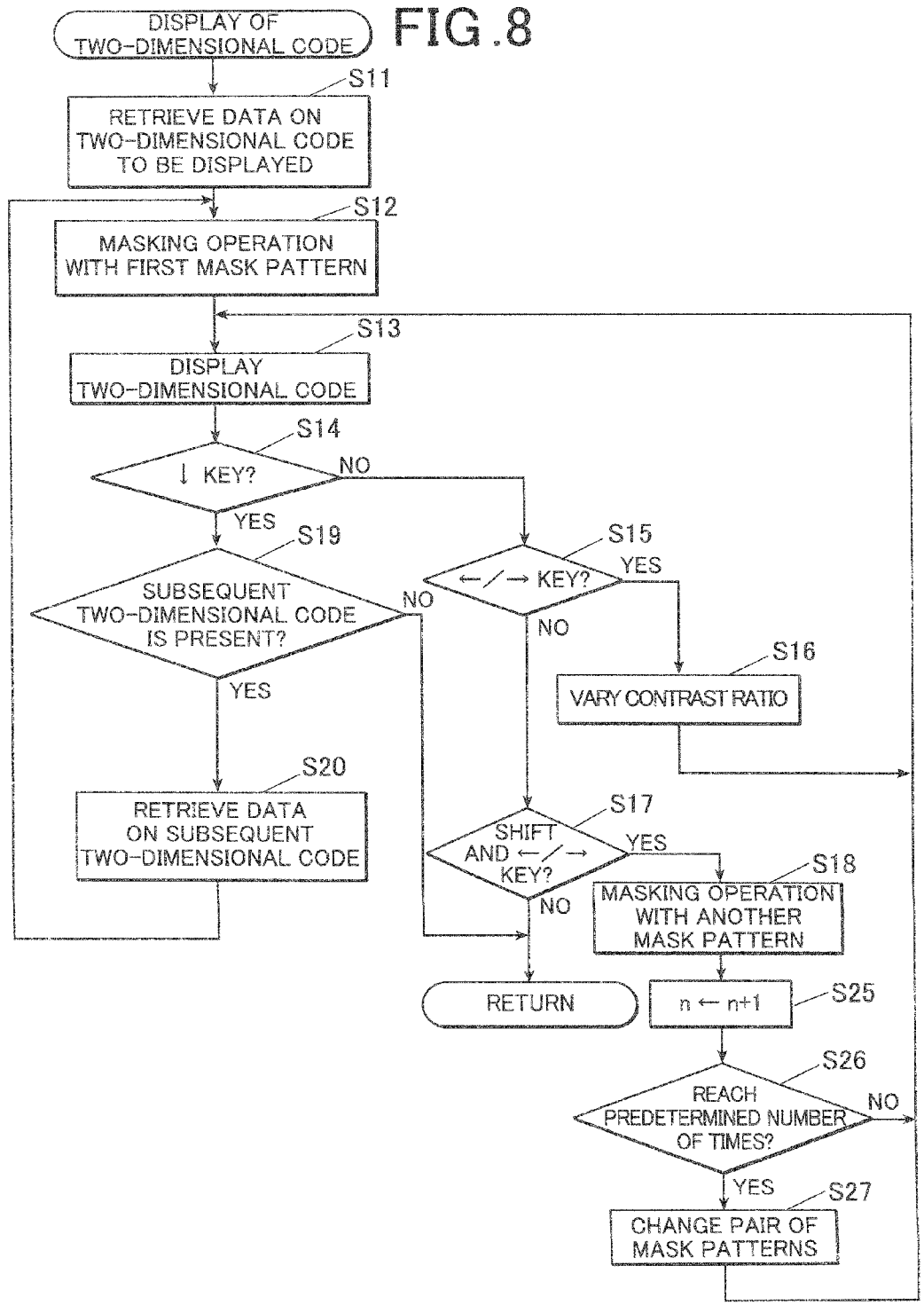

ELECTRONIC DEVICE, METHOD OF DISPLAYING TWO-DIMENSIONAL CODE, AND RECORDING MEDIUM WITH PROGRAM RECORDED THEREON

CROSS-REFERENCE TO RELATED APPLICATIONS

This application is based upon and claims the benefit of priority from the prior Japanese Patent Application No. 2014-230356 filed on Nov. 13, 2014, the entire contents of which are incorporated herein by reference.

BACKGROUND OF THE INVENTION

1. Field of the Invention

The present invention relates to electronic devices displaying two-dimensional codes, methods of displaying two-dimensional codes, and recording media with programs recorded thereon.

2. Description of the Related Art

Various electronic devices have recently been developed that display two-dimensional codes, such as a QR code (registered trademark), on their display screens.

For example, Japanese Patent Application Laid-Open Publication No. 2011-76540 discloses a technique for readily transferring text data edited in a document editor to another electronic device by encoding the text data into a two-dimensional code, displaying the code, capturing the code into, for example, a smartphone, cellular phone, or tablet computer having an imaging function, and uploading the captured data to a predetermined website or transferring the captured data to a personal computer through Internet mail.

In display of a two-dimensional code, if the encoding region, that is, a region other than function patterns, such as a position detection pattern and a timing pattern, of the two-dimensional code has a significantly large number of bright or dark modules or has a pattern similar to, for example, the position detection pattern, the two-dimensional code cannot be properly captured by imaging it with, for example, a smartphone having an imaging function in some cases.

To prevent such a situation, a masking operation is performed with an optimum mask pattern for uniformizing the bright and dark modules, selected among eight mask patterns prepared for the QR code, to generate a two-dimensional code.

Unfortunately, an electronic device, such as a scientific calculator with a central processing unit (CPU) not having particularly high throughput, takes a considerable time for the masking operations with the eight mask patterns. This increases the time for the user to image the two-dimensional code with a code reader, such as a smartphone with an imaging function, which makes the user feel that the electronic device is inconvenient.

Encoding tabular data used in a statistical computation or a table computation using a spreadsheet may generate multiple two-dimensional codes. Since each of the two-dimensional codes involves masking operations with the eight mask patterns, the situation becomes more critical.

It is an object of the present invention to provide an electronic device capable of promptly displaying a two-dimensional code readable by a code reader, without particularly high CPU performance, and a method of displaying a two-dimensional code.

SUMMARY OF THE INVENTION

To solve the above problems, there is provided an electronic device including: a display unit which displays data and at least one two-dimensional code; and a processor; wherein the processor performs: an encoding process of encoding the data being displayed on the display unit into the two-dimensional code; a two-dimensional code displaying process of performing a first masking operation to the two-dimensional code obtained by the encoding process with a first mask pattern and displaying the two-dimensional code having been subjected to the first masking operation on the display unit; and a two-dimensional code changing process of performing a second masking operation to the two-dimensional code obtained by the encoding process with a second mask pattern, and displaying the two-dimensional code having been subjected to the second masking operation instead of the two-dimensional code having been subjected to the first masking operation on the display unit, when a user operation is executed while the two-dimensional code having been subjected to the first masking operation is displayed on the display unit.

The present invention can promptly display a two-dimensional code readable by a code reader even if an electronic device does not have particularly high CPU performance.

BRIEF DESCRIPTION OF THE SEVERAL VIEWS OF THE DRAWINGS

The above and further objects, features and advantages of the present invention will be made clearer by the following detailed description and the attached drawings, in which:

FIG. 6 illustrates operations and example display on the display unit in the two-dimensional code displaying process;

FIG. 7 is a flowchart describing the steps of Modification 1; and

FIG. 8 is a flowchart describing the steps of Modification 2.

DETAILED DESCRIPTION OF THE PREFERRED EMBODIMENTS

An electronic device in accordance with embodiments of the present invention will now be described with reference to the attached drawings. In the following description, the electronic device is a scientific calculator. The present invention can also be applied to any electronic device capable of displaying a two-dimensional code on a display unit. The scope of the present invention should not be limited to the illustrated examples.

Figure 1:
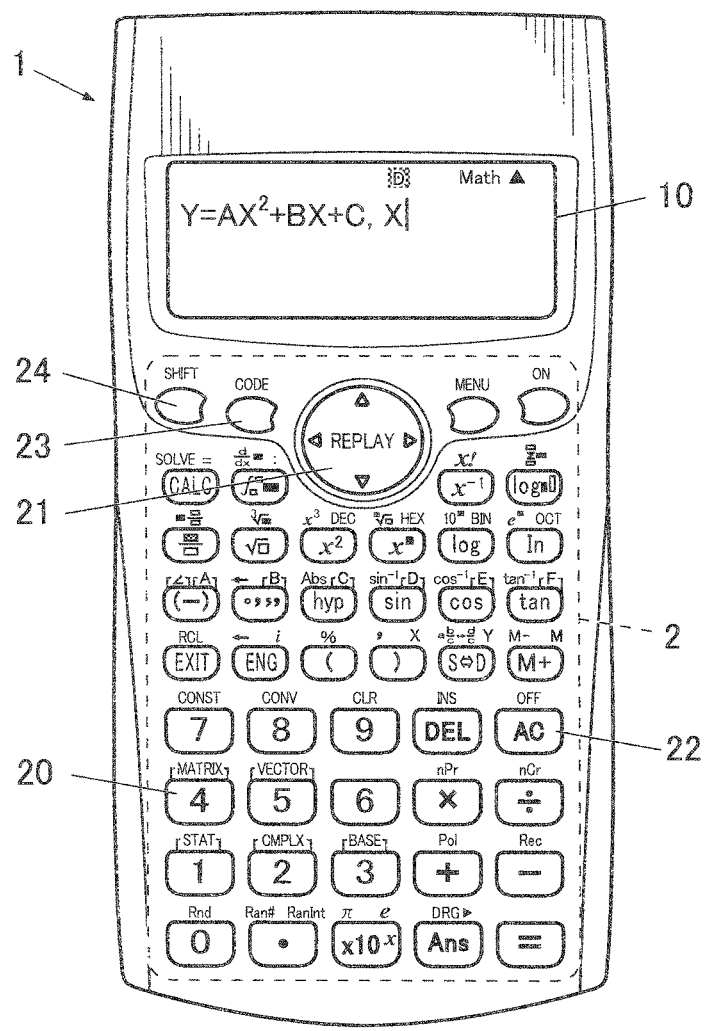
FIG. 1 is a schematic plan view of a scientific calculator as an example electronic device.

FIG. 1 is a plan view of a scientific calculator 1. The scientific calculator 1 includes an input key group 2 consisting of various keys, and a display unit 10.

The input key group 2 receives user operations for inputting numerical values and elements in mathematical expressions, such as mathematical symbols, and operations for commanding various processes and includes multiple keys with specific functions. The input key group 2 includes numeric keys 20, a cursor key 21, an AC key 22, a CODE key 23, and a SHIFT key 24.

The numeric keys 20 receive operations for inputting numerical values. The cursor key 21 is pressed to move a cursor indicating a position to be edited or selected on the display unit 10 in a predetermined direction. In this embodiment, the cursor key 21 receives input in four, up, down, left, and right, directions.

The AC key 22 is pressed to completely clear, for example, a computation having been done until that time. In this embodiment, pressing the AC key 22 with the display unit 10 displaying a two-dimensional code cancels the display of the two-dimensional code and returns the display unit 10 to an original state.

The CODE key 23 is pressed to encode the data being displayed on the display unit 10 into a two-dimensional code and display the code. In this embodiment, pressing the CODE key 23 with the display unit 10 displaying a two-dimensional code cancels the display of the two-dimensional code in the same manner as the AC key 22.

In this embodiment, pressing the SHIFT key 24 and then the position "→" or "←" of the cursor key 21 switches a mask pattern to be used for masking a two-dimensional code. This will be described later.

The display unit 10 is composed of, for example, a reflective simple-matrix liquid crystal display and displays various data, such as characters, signs, symbols, expressions, and the computed results, and a two-dimensional code, such as a QR code, with multiple dots. The display unit 10 may be provided with a touch panel over the entire display screen.

[Internal Configuration]

Figure 2:
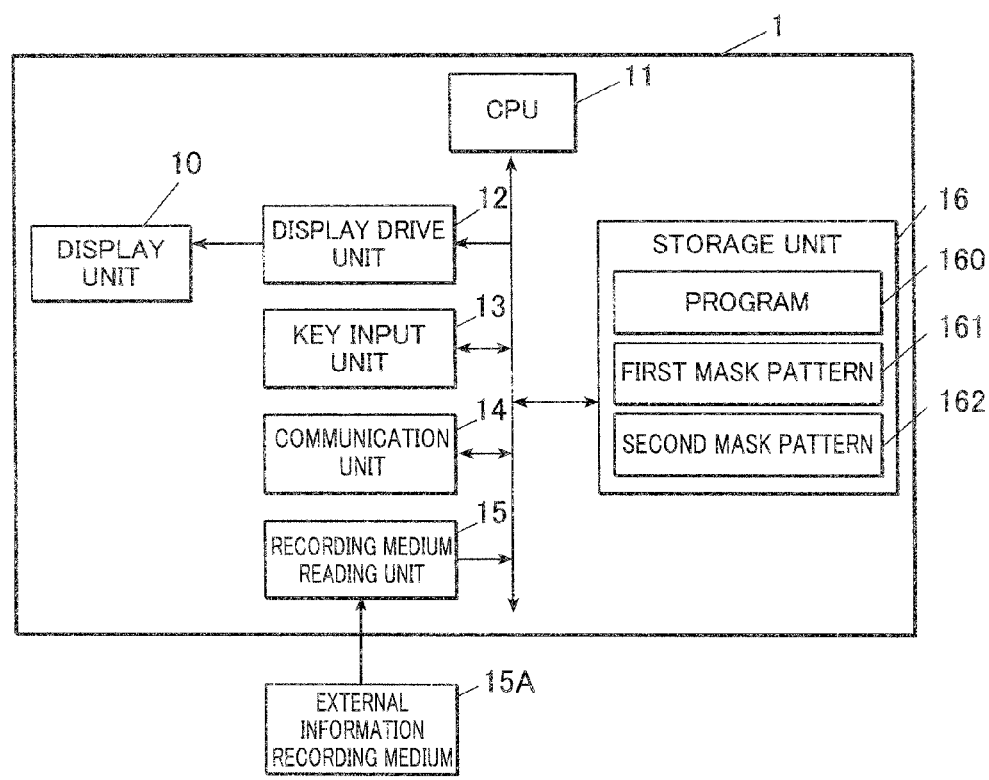
FIG. 2 is a block diagram of the internal configuration of the scientific calculator.

FIG. 2 is a block diagram of the internal configuration of the scientific calculator 1. The scientific calculator 1 includes a CPU 11, a display drive unit 12, a key input unit 13, a communication unit 14, a recording medium reading unit 15, and a storage unit 16.

The display drive unit 12 controls the display of various pieces of information on the display unit 10 in accordance with control from the CPU 11. The display drive unit 12 adjusts the contrast ratio of the display on the display unit 10 through a key operation by the user.

In the case of a reflective simple-matrix liquid crystal display, a variation in applied voltage leads to variations in reflectance of a lighting (black) portion and a non-lighting (white) portion and thus a variation in the ratio of the reflectance of the white portion to the reflectance of the black portion, that is, a contrast ratio. The display drive unit 12 varies the value of a voltage applied to liquid crystals to vary the contrast ratio.

The key input unit 13 includes the input key group 2 and the optional touch panel and outputs a key input signal corresponding to a key operated by the user to the CPU 11. In response to the key input signal, the CPU 11 displays a mathematical expression and/or tabular data on the display unit 10, executes a computation, or performs a process.

The scientific calculator 1 can be connected to, for example, a network (not shown), so that the communication unit 14 communicates, through the network, with an external device, such as a server and a computer, connected to the network.

The recording medium reading unit 15 reads information from an external information recording medium 15A mounted detachably, such as a USB memory. A program (described later) of the present invention may be read from the external information recording medium 15A through the recording medium reading unit 15. The program of the present invention may be read from the scientific calculator 1 to the external information recording medium 15A.

The storage unit 16 is memory that stores programs, etc. The storage unit 16 includes several storage areas, for example, a storage area 160 storing a program for executing the functions of the scientific calculator 1, especially a program of the present invention for encoding tabular data into a proper two-dimensional code and storage areas 161 and 162 storing first and second mask patterns (described later), respectively.

The first and second mask patterns are preliminary selected and stored from, for example, the eight standardized mask patterns.

The storage unit 16 includes a work area (not shown) for temporarily storing a mathematical expression or tabular data displayed on the display unit 10.

The CPU 11 comprehensively controls the individual units of the scientific calculator 1. In specific, the CPU 11 reads a program specified among system programs and various application programs stored in the respective areas of the storage unit 16, develops the program into the work area of the storage unit 16, and executes a process of interest in cooperation with the program developed in the storage unit 16. The CPU 11 controls the display drive unit 12 such that a required item appears on the display unit 10.

[Operation]

The operation of the scientific calculator 1 will now be described with reference to the flowcharts in the drawings.

[Basic Operation]

The basic operation of the scientific calculator 1 in accordance with this embodiment will now be described with reference to the flowchart in FIG. 3.

When the scientific calculator 1 is turned on (Step S1) for use, the CPU 11 of the scientific calculator 1 controls the individual operational units to perform predetermined initial operations and starts a computation (Step S2). If receiving no code display command from the user (Step S3: NO), the CPU 11 performs a normal operation in response to a key operation by the user (Step S4) and displays a mathematical expression, characters, and computed results on the display unit 10 on the basis of the normal operation (Step S5).

Figure 4A:
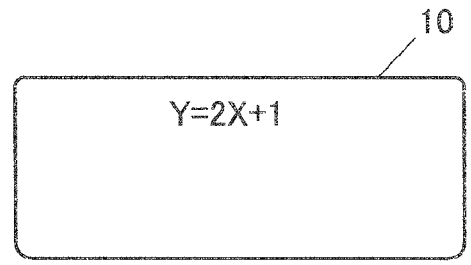
FIG. 4A illustrates an example mathematical expression appearing on the display unit.
Figure 4B:
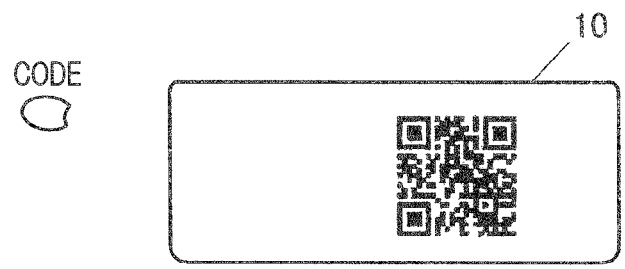
FIG. 4B illustrates an example two-dimensional code displayed by encoding the mathematical expression.

If the user presses the CODE key 23 to provide a two-dimensional code display command, the CPU 11 encodes the data, such as a mathematical expression (See FIG. 4A), appearing on the display unit 10 into a two-dimensional code and displays the code (See FIG. 4B). The scientific calculator 1 thus encodes the data and displays the code on the display unit 10 with a single touch (a press of the CODE key 23).

In specific, if the CPU 11 detects the press of the CODE key 23 for a code display command (Step S3: YES), the CPU 11 determines whether the data being displayed on the display unit 10 is encodable (Step S6). If determining that the data is not encodable (Step S6: NO), the CPU 11 displays an error message saying, for example, "Not encodable into a two-dimensional code" (Step S7) and returns to the normal operation (Step S4).

If determining that the displayed data is encodable (Step S6: YES), the CPU 11 encodes the displayed data into a two-dimensional code (Step S8). The CPU 11 then performs a two-dimensional code displaying process including the masking operation to display the two-dimensional code on the display unit 10 as shown in FIG. 4B (Step S9). The two-dimensional code displaying process will be described later. Only one two-dimensional code appears on the display unit 10 in FIG. 4(B); however, encoding a large amount of tabular data generates multiple two-dimensional codes. In this case, the multiple two-dimensional codes sequentially appears on the display unit 10.

The user reads the displayed two-dimensional code with a reader, such as a smartphone with an imaging function, and the reader performs a series of operations including the display of the graph corresponding to the read mathematical expression on the smartphone screen. When the user presses the AC key 22 or CODE key 23 (Step S10: YES), the CPU 11 cancels the display of the two-dimensional code on the display unit 10. This returns the display on the display unit 10 to a state immediately before the display of the two-dimensional code, and the process returns to the normal computation (Step S2).

[Two-dimensional Code Displaying Process]

Figure 5:
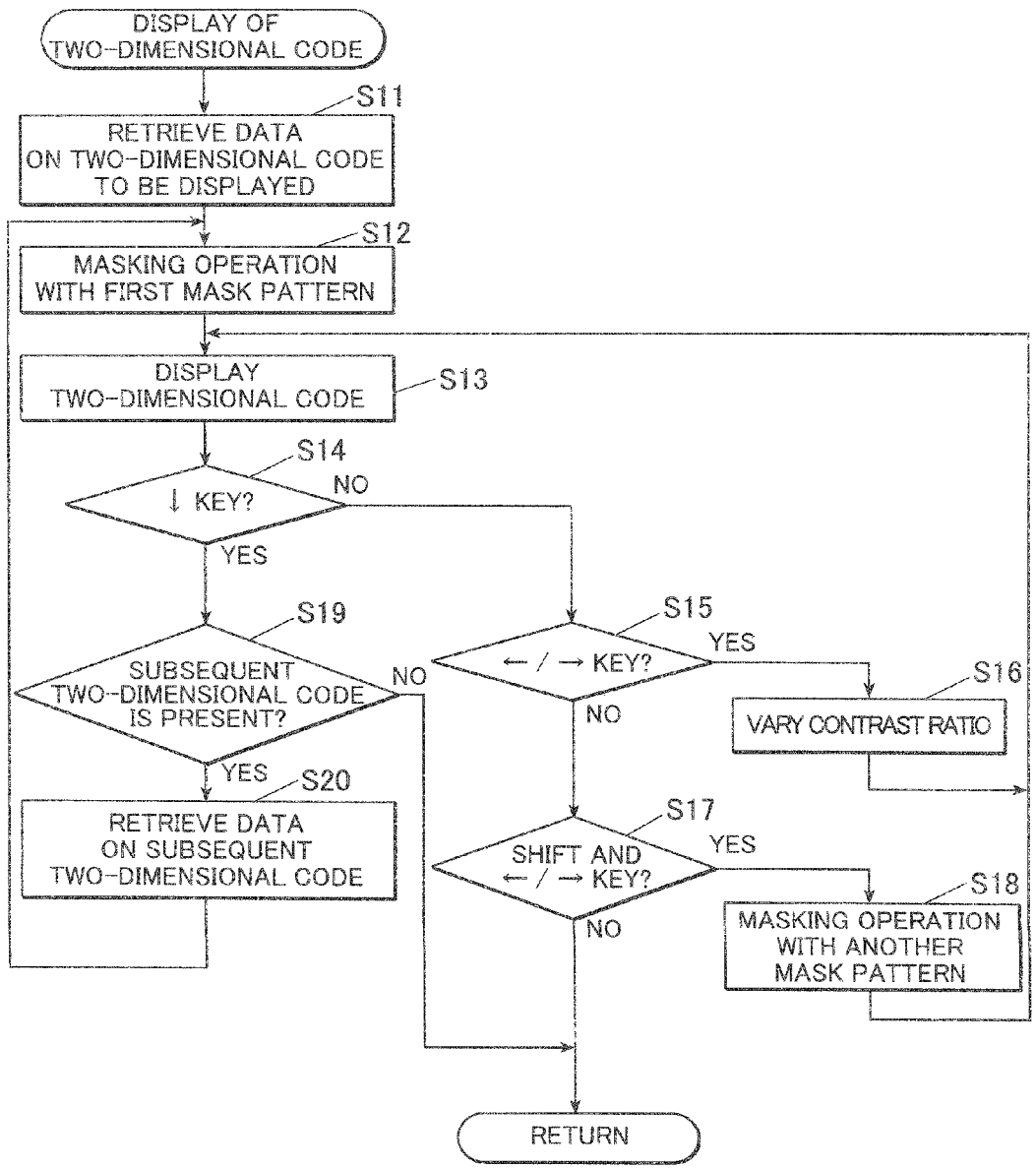
FIG. 5 is a flowchart describing the steps of a two-dimensional code displaying process of the scientific calculator.

The two-dimensional code displaying process (Step S9 in FIG. 3) will now be described with reference to the flowchart in FIG. 5 and the screen flowchart in FIG. 6.

In the example described below, the tabular data at the left part of FIG. 6 is encoded, and nine two-dimensional codes are generated. The two-dimensional code before the masking operation may be referred to as an original two-dimensional code in the following description.

Figure 3:
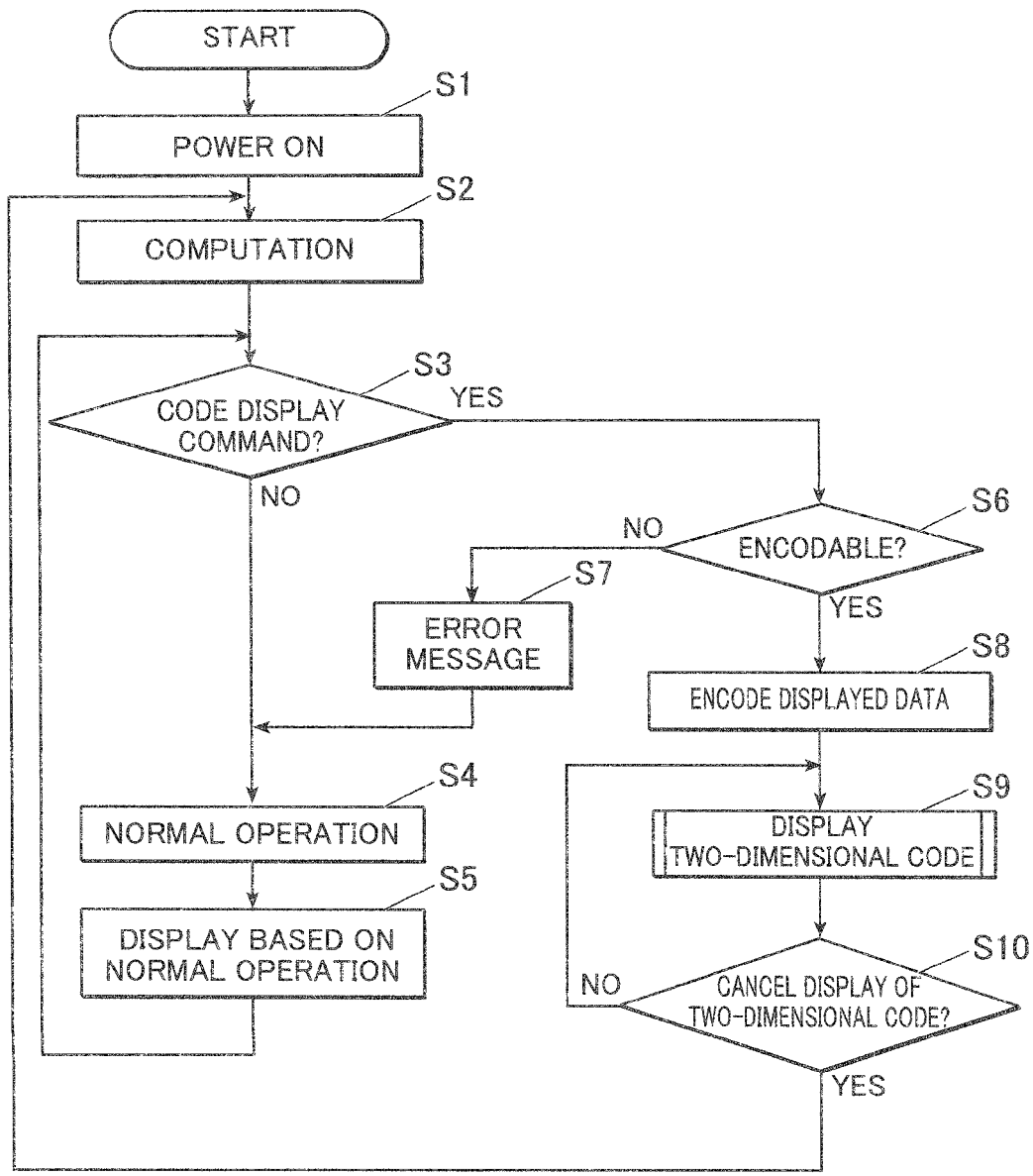
FIG. 3 is flowchart describing the steps of the basic operation of the scientific calculator.

In Step S8 of the flowchart in FIG. 3, the CPU 11 encodes the tabular data at the left part of FIG. 6 to generate nine original two-dimensional codes. The CPU 11 then performs the two-dimensional code displaying process (Step S9 in FIG. 3). In the two-dimensional code displaying process, the CPU 11 retrieves the data on the bit pattern of the first two-dimensional code to be displayed first among the nine original two-dimensional codes to be displayed (Step S11 in FIG. 5).

The CPU 11 reads the first mask pattern stored in the storage area 161 (See FIG. 2) of the storage unit 16 and performs the masking operation to the first two-dimensional code with the first mask pattern (Step S12). In other words, the CPU 11 takes the exclusive logical sum (XOR) of the bit pattern of the encoding region of the first two-dimensional code and the first mask pattern to generate a new masked two-dimensional code.

The two-dimensional code after the masking operation appears on the display unit 10 (Step S13). (See the two-dimensional code at the uppermost central part of FIG. 6.)

At this point, the user reads the two-dimensional code appearing on the display unit 10 with the reader, such as a smartphone. In this state, a press of the position "→" of the cursor key 21 (See FIG. 1) by the user increases the contrast ratio of the displayed two-dimensional code, and a press of the position "←" of the cursor key 21 decreases the contrast ratio (not shown in FIG. 6). If the reader cannot read the two-dimensional code, the user varies the contrast ratio by a press of the position "→" or "←" of the cursor key 21 and reads the code again with the reader.

In specific, if the CPU 11 detects that the user presses the position "→" or "←" of the cursor key 21 (Step S14: NO, Step S15: YES), the display drive unit 12 (See FIG. 2) then varies the voltage to be applied to the display unit 10 in accordance with the pressed key to increase or decrease the contrast ratio of the two-dimensional code (Step S16). The CPU 11 displays the two-dimensional code with the varied contrast ratio on the display unit 10 (Step S13).

If the user presses the SHIFT key 24 and then the position "→" or "←" of the cursor key 21 (Step S17: YES), the CPU 11 reads the second mask pattern stored in the storage area 162 of the storage unit 16 and switches the mask pattern used for the masking operation from the first mask pattern to another mask pattern, the second mask pattern (See the right part of FIG. 6).

The CPU 11 performs the masking operation to the original two-dimensional code with the second mask pattern (Step S18), and displays the two-dimensional code masked with the second mask pattern on the display unit 10 (Step S13).

A predetermined user operation, that is, the press of the SHIFT key and the position "→" during display of the two-dimensional code masked with the first mask pattern on the display unit 10 causes the CPU 11 to switch the mask pattern to another mask pattern, the second mask pattern, to perform the masking operation to the original two-dimensional code, and to display the code again on the display unit 10.

Incidentally, if the user presses the SHIFT key 24 and the position "→" or "←" of the cursor key 21 again (Step S17: YES) after the display of the switched mask pattern, the mask pattern is switched again.

The two mask patterns are preliminarily selected among the eight standardized mask patterns, such that the bit patterns of the encoding regions of the two-dimensional codes after the masking operations with these mask patterns have significantly different characteristics from each other. The mask patterns are preliminarily stored in the respective storage areas 161 and 162 of the storage unit 16 as the first and second mask patterns at the time of the manufacture of the electronic device.

If the reader cannot read the two-dimensional code generated with the first mask pattern even though the contrast ratio is varied, a two-dimensional code having a different pattern can be displayed by switching to the second mask pattern. This enables the reader to surely read the code in combination with the contrast ratio adjustment.

The two-dimensional code generated first (Step S12), two-dimensional code having the varied contrast ratio (Step S16), or two-dimensional code masked with the switched mask pattern (Step S18) appears on the display unit 10 (Step S13), and the user reads the code with the reader. If the user then presses the position "↓" of the cursor key 21 (Step S14: YES), it is determined whether the subsequent original two-dimensional code not subjected to the displaying process yet is present (Step S19).

With reference to FIG. 6, if a plurality of original two-dimensional codes is generated and thus the second two-dimensional code is present (See the two-dimensional code "2/9" illustrated in FIG. 6) (Step S19: YES), the second two-dimensional code is subsequently processed. If only one two-dimensional code is generated and thus there is no subsequent two-dimensional code as shown in FIG. 4B (Step S19: NO), the CPU 11 ends the displaying process to the two-dimensional code.

If the subsequent two-dimensional code is present (Step S19: YES), the CPU 11 retrieves the data on the bit pattern of the subsequent two-dimensional code (in this case, the second two-dimensional code) (Step S20) and repeats the process, starting with the masking operation with the first mask pattern (Step S12).

In this embodiment, if multiple two-dimensional codes to be masked are present, the CPU 11 switches these two-dimensional codes one by one and performs the masking operation. At each switch of the two-dimensional code to be processed, the CPU 11 starts with a masking operation with one mask pattern (the first mask pattern) of the one mask pattern (the first mask pattern) and the other mask pattern (the second mask pattern). This configuration eliminates the process to store the mask pattern, i.e., the first or second mask pattern, used last in the masking operation to the previous two-dimensional code, facilitating the program construction.

In this embodiment, the CPU 11 sequentially performs the masking operation and the displaying process to the original two-dimensional code at each press of the position "↓".

In this embodiment, if multiple two-dimensional codes are generated, the CPU 11 starts with the masking operation to the two-dimensional code using the first mask pattern (See Step S12). For example, the CPU 11 may start with the masking operation using the mask pattern used last in the masking operation to the previous two-dimensional code when the CPU 11 performs the process to the subsequent two-dimensional code (Step S19: YES). That is, if the second mask pattern is used last in the masking operation to the previous two-dimensional code, the masking operation to the subsequent two-dimensional code may be performed using the second mask pattern.

If the user presses the AC key 22 or CODE key 23 to command the cancellation of the display of the two-dimensional code (Step S10 in FIG. 3: YES), the CPU 11 returns to the display of the tabular data on the display unit 10, for example, as shown in FIG. 6.

Advantageous Effect

The masking operation to the two-dimensional code is performed with one mask pattern (the first mask pattern) or another mask pattern (the second mask pattern) switched from the first mask pattern as required. This enables the CPU 11 without particularly high throughput to promptly perform the masking operation to the two-dimensional code.

In the above embodiment, the user presses the position "↓" of the cursor key 21 to display the subsequent one among the multiple two-dimensional codes. A press of the position "↑" may return the display of the previous two-dimensional code, for example, from "2/9" to "1/9".

Various modifications will now be described.

[Modification 1]

In the above embodiment, if multiple two-dimensional codes are displayed, the first mask pattern is used to process the subsequent two-dimensional code. In some cases, the second mask pattern should be used first in the masking operation, instead of fixing the first mask pattern as the mask pattern to be applied first.

In this case, the CPU 11 counts the number of processes with the second mask pattern. When the number reaches a predetermined value, the CPU 11 switches the mask pattern to be used first in the masking operation between the first mask pattern (one mask pattern) and the second mask pattern (the other mask pattern). This process will now be described with reference to the flowchart in FIG. 7. The same steps in the flowcharts in FIG. 7 and FIG. 5 have the same step numbers.

If the CPU 11 detects a press of the position "↓" of the cursor key 21 (Step S14: YES) after Steps S11 to S18 (the same as those in the flowchart in FIG. 5), the CPU 11 determines whether the second mask pattern is used in the current masking operation (Step S21).

If the second mask pattern is used (Step S21: YES), the counter value n is incremented by one (Step S22). The counter value n indicates the number of times that the reader can read the two-dimensional code having been subjected to the masking operation with the second mask pattern.

The CPU 11 determines whether the counter value n reaches a predetermined value, for example, 2. If the value n reaches the predetermined value (Step S23: YES), the CPU 11 switches between the first and second mask patterns stored in the respective storage areas 161 and 162 of the storage unit 16 (Step S24). This indicates that the mask pattern to be used first in the masking operation to display the subsequent two-dimensional code is switched from the first mask pattern to the second mask pattern.

[Modification 2]

In the above embodiment and Modification 1, the scientific calculator 1 (electronic device) preliminarily stores two mask patterns in the storage unit 16, and performs the masking operation while switching the patterns.

A smartphone cannot properly capture the two-dimensional code in some cases despite a masking operation with any of the first and second mask patterns preliminarily stored in the storage unit 16.

In this case, the scientific calculator 1 (electronic device) preliminarily stores multiple pairs of two mask patterns in the storage unit 16. For example, four pairs are each formed by combining two mask patterns among the eight mask pattern, such that the bit patterns of the encoding regions of the two-dimensional codes after the masking operation with these mask patterns have significantly different characteristics from each other. The pairs are preliminarily stored in the storage unit 16.

The number of switching operations between one pair of mask patterns is counted. When the number reaches a predetermined value, the pair of mask patterns used for the masking operation is changed to another pair. This process will now be described in detail with reference to the flowchart in FIG. 8. The same steps in the flowcharts in FIG. 8 and FIG. 5 have the same step numbers.

If the user performs a predetermined operation, that is, the press of the SHIFT key 24 and the position "→" of the cursor key 21 (Step S17: YES), the mask pattern to be used is switched to another mask pattern, and then the masking operation is performed (Step S18). The counter value n is then incremented by one (Step S25). If the reader cannot read the displayed two-dimensional code, the user switches the mask pattern and reads the code. Thus, the counter value n indicates the number of switching operations from the mask pattern.

If the counter value n reaches a predetermined value, for example, 2 (Step S26: YES), the CPU 11 changes the first and second mask patterns stored in the respective storage areas 161 and 162 of the storage unit 16 to another pair of mask patterns (Step S27).

That is, the eight standardized mask patterns A to H are preliminarily stored in the storage unit 16 in the form of pairs of A and B, C and D, E and F, and G and H. The CPU 11 first selects the pair of mask patterns A and B, stores the mask pattern A (the first mask pattern) in the storage area 161 of the storage unit 16 and the mask pattern B (the second mask pattern) in the storage area 162 of the storage unit 16, and performs the masking operation and the displaying process.

In this state, if the number n of switching operations from the mask patterns reaches a predetermined value (Step S26: YES), the CPU 11 changes the pair of mask patterns (Step S27) by selecting the pair of mask patterns C and D and stores the selected pair in the storage areas 161 and 162 of the storage unit 16.

If the pair of two selected mask patterns, i.e., the first and second mask patterns does not allow the smartphone or the like to properly capture the two-dimensional code after the masking operation and thus the mask patterns need to be switched frequently, the pair of mask patterns is automatically changed, and the masking operation using new mask patterns is performed to the two-dimensional code.

While the embodiments and modifications of the present invention have been described, the scope of the present invention should not be limited thereto and includes the scope of the appended claims and the scope of all equivalents thereof.

What is claimed is:

1. An electronic device comprising:
   a display unit which displays data and at least one two-dimensional code; and
   a processor;
   wherein the processor performs:
   an encoding process of encoding the data displayed on the display unit into the two-dimensional code;
   a two-dimensional code displaying process of performing a first masking operation to the two-dimensional code obtained by the encoding process with a first mask pattern and displaying the two-dimensional code having been subjected to the first masking operation on the display unit;
   an operation receiving process of receiving a user operation to change mask patterns while the two-dimensional code having been subjected to the first masking operation is displayed on the display unit; and
   a two-dimensional code changing process of performing a second masking operation to the two-dimensional code obtained by the encoding process with a second mask pattern, and displaying the two-dimensional code having been subjected to the second masking operation instead of the two-dimensional code having been subjected to the first masking operation on the display unit, when the operation receiving process receives the user operation to change mask patterns.

2. The electronic device according to claim 1, further comprising:
   a storage unit storing the first mask pattern and the second mask pattern.

3. The electronic device according to claim 1, wherein the processor further performs:
   a sequential displaying process of sequentially displaying multiple two-dimensional codes one by one in response to a user operation, when the encoding process obtains the multiple two-dimensional codes; and
   a mask controlling process of performing a control to execute a masking operation with the first mask pattern when the sequential displaying process displays a subsequent two-dimensional code among the multiple two-dimensional codes after the two-dimensional code changing process displays the two-dimensional code.

4. The electronic device according to claim 3, wherein the processor further performs:
   a switching process of counting a number of display operations of the two-dimensional codes having been subjected to the second masking operation by the two-dimensional code changing process when the encoding process obtains the multiple two-dimensional codes, and mutually switching the first mask pattern and the second mask pattern when the number reaches a predetermined value.

5. The electronic device according to claim 3, further comprising:
   a mask-pattern storage unit storing multiple pairs of two mask patterns other than the first and second mask patterns;
   wherein the processor further performs:
   a mask pattern changing process of counting a number of display operations of the two-dimensional codes having been subjected to the second masking operation by the two-dimensional code changing process when the encoding process obtains the multiple two-dimensional codes, and changing the first mask pattern and the second mask pattern to another pair of mask patterns stored in the mask-pattern storage unit when the number reaches a predetermined value.

6. The electronic device according to claim 1, wherein the processor further performs:
   a computing process of executing computation of a calculator;
   a command receiving process of receiving a command to convert computational data in the computing process, the computational data being displayed on the display unit, into the two-dimensional code; and
   a canceling process of cancelling the display of the two-dimensional code to return to the display of the computational data when the two-dimensional code displaying process or the two-dimensional code changing process displays the two-dimensional code on the display unit.

7. A method of displaying at least one two-dimensional code on an electronic device equipped with a display unit which displays data and the two-dimensional code, the method comprising the steps of:
   (a) encoding the data being displayed on the display unit into the two-dimensional code;
   (b) performing a first masking operation to the two-dimensional code obtained by the step (a) with a first mask pattern and displaying the two-dimensional code having been subjected to the first masking operation on the display unit;
   (c) receiving a user operation to change mask patterns while the two-dimensional code having been subjected to the first masking operation is displayed on the display unit; and
   (d) performing a second masking operation to the two-dimensional code obtained by the step (a) with a second mask pattern, and displaying the two-dimensional code having been subjected to the second masking operation instead of the two-dimensional code having been subjected to the first masking operation on the display unit, when the step (c) receives the user operation to change mask patterns.

8. The method of displaying the two-dimensional code according to claim 7, wherein:
   the electronic device further includes a storage unit storing the first mask pattern and the second mask pattern;
   the step (b) reads the first mask pattern from the storage unit and performs the first masking operation; and
   the step (d) reads the second mask pattern from the storage unit and performs the second masking operation.

9. The method of displaying the two-dimensional code according to claim 7, further comprising the steps of:
   (e) sequentially displaying multiple two-dimensional codes one by one in response to a user operation, when the step (a) obtains the multiple two-dimensional codes; and
   (f) performing a control to execute a masking operation with the first mask pattern when the step (e) displays a subsequent two-dimensional code among the multiple two-dimensional codes after the step (d) displays the two-dimensional code.

10. The method of displaying the two-dimensional code according to claim 9, further comprising the step of:
    (g) counting a number of display operations of the two-dimensional codes having been subjected to the second masking operation in the step (d) when the step (a) obtains the multiple two-dimensional codes, and mutually switching the first mask pattern and the second mask pattern when the number reaches a predetermined value.

11. The method of displaying the two-dimensional code according to claim 9, wherein the electronic device further includes a mask-pattern storage unit storing multiple pairs of two mask patterns other than the first and second mask patterns, the method further comprising the step of:

(h) counting a number of display operations of the two-dimensional codes having been subjected to the second masking operation in the step (d) when the step (a) obtains the multiple two-dimensional codes, and changing the first mask pattern and the second mask pattern to another pair of mask patterns stored in the mask-pattern storage unit when the number reaches a predetermined value.

12. The method of displaying the two-dimensional code according to claim 7, wherein the electronic device further includes a computing member executing computation of a calculator, the method further comprising the steps of:

(i) receiving a command to convert computational data in the computing member, the computational data being displayed on the display unit, into the two-dimensional code; and (j) cancelling the display of the two-dimensional code to return to the display of the computational data when the step (b) or the step (c) displays the two-dimensional code on the display unit.

13. A non-transitory recording medium having recorded thereon a program which causes an electronic device equipped with a display unit which displays data and at least one two-dimensional code to perform:

an encoding process of encoding the data displayed on the display unit into the two-dimensional code;

a two-dimensional code displaying process of performing a first masking operation to the two-dimensional code obtained by the encoding process with a first mask pattern and displaying the two-dimensional code having been subjected to the first masking operation on the display unit;

an operation receiving process of receiving a user operation to change mask patterns while the two-dimensional code having been subjected to the first masking operation is displayed on the display unit; and a two-dimensional code changing process of performing a second masking operation to the two-dimensional code obtained by the encoding process with a second mask pattern, and displaying the two-dimensional code having been subjected to the second masking operation instead of the two-dimensional code having been subjected to the first masking operation on the display unit, when the operation receiving process receives the user operation to change mask patterns.

14. The recording medium according to claim 13, wherein the program further causes the electronic device to perform a storing process of storing the first mask pattern and the second mask pattern in a memory.

15. The recording medium according to claim 13, wherein the program further causes the electronic device to perform:

a sequential displaying process of sequentially displaying multiple two-dimensional codes one by one in response to a user operation, when the encoding process obtains the multiple two-dimensional codes; and a mask controlling process of performing a control to execute a masking operation with the first mask pattern when the sequential displaying process displays a subsequent two-dimensional code among the multiple two-dimensional codes after the two-dimensional code changing process displays the two-dimensional code.

16. The recording medium according to claim 15, wherein the program further causes the electronic device to perform a switching process of counting a number of display operations of the two-dimensional codes having been subjected to the second masking operation by the two-dimensional code changing process when the encoding process obtains the multiple two-dimensional codes, and mutually switching the first mask pattern and the second mask pattern when the number reaches a predetermined value.

17. The recording medium according to claim 15, wherein the program further causes the electronic device to perform:

a mask-pattern storing process of storing multiple pairs of two mask patterns other than the first and second mask patterns in a memory; and a mask pattern changing process of counting a number of display operations of the two-dimensional codes having been subjected to the second masking operation by the two-dimensional code changing process when the encoding process obtains the multiple two-dimensional codes, and changing the first mask pattern and the second mask pattern to another pair of mask patterns stored in the memory when the number reaches a predetermined value.

18. The recording medium according to claim 13, wherein the program further causes the electronic device to perform:

a computing process of executing computation of a calculator;

a command receiving process of receiving a command to convert computational data in the computing process, the computational data being displayed on the display unit, into the two-dimensional code; and a canceling process of cancelling the display of the two-dimensional code to return to the display of the computational data when the two-dimensional code displaying process or the two-dimensional code changing process displays the two-dimensional code on the display unit.

19. An electronic device comprising:

a display unit which displays data and at least one two-dimensional code; and a processor;

wherein the processor performs:

an encoding process of encoding the data displayed on the display unit into the two-dimensional code;

a two-dimensional code displaying process of performing a first masking operation to the two-dimensional code obtained by the encoding process with a first mask pattern and displaying the two-dimensional code having been subjected to the first masking operation on the display unit;

a two-dimensional code changing process of performing a second masking operation to the two-dimensional code obtained by the encoding process with a second mask pattern, and displaying the two-dimensional code having been subjected to the second masking operation instead of the two-dimensional code having been subjected to the first masking operation on the display unit, when a user operation is executed while the two-dimensional code having been subjected to the first masking operation is displayed on the display unit;

a sequential displaying process of sequentially displaying multiple two-dimensional codes one by one in response to a user operation, when the encoding process obtains the multiple two-dimensional codes; and a mask controlling process of performing a control to execute a masking operation with the first mask pattern when the sequential displaying process displays a subsequent two-dimensional code among the multiple two-dimensional codes after the two-dimensional code changing process displays the two-dimensional code.

20. An electronic device comprising:
a display unit which displays data and at least one two-dimensional code; and
a processor;
wherein the processor performs:
an encoding process of encoding the data displayed on the display unit into the two-dimensional code;
a two-dimensional code displaying process of performing a first masking operation to the two-dimensional code obtained by the encoding process with a first mask pattern and displaying the two-dimensional code having been subjected to the first masking operation on the display unit;
a two-dimensional code changing process of performing a second masking operation to the two-dimensional code obtained by the encoding process with a second mask pattern, and displaying the two-dimensional code having been subjected to the second masking operation instead of the two-dimensional code having been subjected to the first masking operation on the display unit, when a user operation is executed while the two-dimensional code having been subjected to the first masking operation is displayed on the display unit;
a computing process of executing computation of a calculator;
a command receiving process of receiving a command to convert computational data in the computing process, the computational data being displayed on the display unit, into the two-dimensional code; and
a canceling process of cancelling the display of the two-dimensional code to return to the display of the computational data when the two-dimensional code displaying process or the two-dimensional code changing process displays the two-dimensional code on the display unit.

21. A method of displaying at least one two-dimensional code on an electronic device equipped with a display unit which displays data and the two-dimensional code, the method comprising the steps of:
(a) encoding the data displayed on the display unit into the two-dimensional code;
(b) performing a first masking operation to the two-dimensional code obtained by the step (a) with a first mask pattern and displaying the two-dimensional code having been subjected to the first masking operation on the display unit;
(c) performing a second masking operation to the two-dimensional code obtained by the step (a) with a second mask pattern, and displaying the two-dimensional code having been subjected to the second masking operation instead of the two-dimensional code having been subjected to the first masking operation on the display unit, when a user operation is executed while the two-dimensional code having been subjected to the first masking operation is displayed on the display unit;
(d) sequentially displaying multiple two-dimensional codes one by one in response to a user operation, when the step (a) obtains the multiple two-dimensional codes; and
(e) performing a control to execute a masking operation with the first mask pattern when the step (d) displays a subsequent two-dimensional code among the multiple two-dimensional codes after the step (c) displays the two-dimensional code.

22. A method of displaying at least one two-dimensional code on an electronic device equipped with a display unit which displays data and the two-dimensional code and a computing member executing computation of a calculator, the method comprising the steps of:
(a) encoding the data displayed on the display unit into the two-dimensional code;
(b) performing a first masking operation to the two-dimensional code obtained by the step (a) with a first mask pattern and displaying the two-dimensional code having been subjected to the first masking operation on the display unit;
(c) performing a second masking operation to the two-dimensional code obtained by the step (a) with a second mask pattern, and displaying the two-dimensional code having been subjected to the second masking operation instead of the two-dimensional code having been subjected to the first masking operation on the display unit, when a user operation is executed while the two-dimensional code having been subjected to the first masking operation is displayed on the display unit;
(d) receiving a command to convert computational data in the computing member, the data being displayed on the display unit, into the two-dimensional code; and
(e) cancelling the display of the two-dimensional code to return to the display of the computational data when the step (b) or the step (c) displays the two-dimensional code on the display unit.

* * * * *